United States Patent

[11] 3,615,810

[72] Inventors Wilhelm Holznagel
Krefeld;
Franz Hund, Krefeld-Bockum; Gottfried Gerlach, Krefeld, all of Germany
[21] Appl. No. 833,146
[22] Filed June 13, 1969
[45] Patented Oct. 26, 1971
[73] Assignee Farbenfabriken Bayer Aktiengesellschaft Leverkusen, Germany
[32] Priority June 26, 1968
[33] Germany
[31] P 17 67 868.1

[54] PRODUCTION OF TEMPERATURE-STABLE IRON-MANGANESE OXIDE BLACK PIGMENT
18 Claims, No Drawings

[52] U.S. Cl. .................................. 106/304
[51] Int. Cl. .................................. C09c 1/24
[50] Field of Search .......................... 106/304

[56] References Cited
UNITED STATES PATENTS
2,811,463  10/1957  Burgyan .................. 106/304
3,201,270  8/1965   Carpenter ................ 106/302

FOREIGN PATENTS
1,191,063  4/1965   Germany

OTHER REFERENCES
Muan et al., Amer. J. of Science, Vol. 260, pp. 230–240 (1962) (Applicants' citation)

Primary Examiner—Tobias E. Levow
Assistant Examiner—H. M. S. Sneed
Attorney—Burgess, Dinklage & Sprung ABSTRACT: Process for the production of a temperature-stable solid black pigment of high tinting strength consisting essentially of mixed oxides of iron and manganese, by calcining an intimate finely divided mixture of oxidic or oxide-forming starting materials of iron and manganese, e.g., $Fe_3O_4$, $Fe(OH)_3$, FeOOH and active $Fe_2O_3$ and $MnCO_3$, $Mn_2O_3$, MnOOH and pyrolusite (i.e., $MnO_2$), in a ratio by weight corresponding to 25–90 parts of $Mn_2O_3$ to 75–10 parts of $Fe_2O_3$, at a temperature of about 800°–920° C. in an atmosphere having an oxygen content of about 7–20 percent by volume, optionally in the presence of an alkali metal salt, e.g., NaCl, or boron oxide, as mineralizer; and the corresponding pigment thereby produced.

PRODUCTION OF TEMPERATURE-STABLE IRON-MANGANESE OXIDE BLACK PIGMENT

This invention relates to the production of a black pigment consisting of mixed oxide phases of iron and manganese. It is stable at temperatures of up to 850° C. and, for this reason, is particularly suitable for incorporation in materials which are subjected to high temperature hardening, such as lime sandstone, for example. Iron oxide black pigments based on $Fe_3O_4$ cannot be used for this purpose because this oxide is known to be oxidized at temperatures above 180° C. into brown or red $Fe_2O_3$.

Some temperature-stable black pigments are already known from the patent literature. For example, U.S. Pat. No. 2,811,463 relates to a product whose main constituents are Cu, Mn and Fe-oxide, whilst U.S. Pat. No. 3,201,270 describes a black pigment whose main constituents are $Co_3O_4$, $Cr_2O_3$ and $Fe_3O_4$. Unfortunately, these pigments are expensive due to their copper and cobalt contents, and for this reason can only be used to a limited extent.

In addition, German Auslegeschrift No. 1,191,063 relates to a process for the production of a temperature-stable iron oxide black pigment which in addition to iron oxide contains from about 7 percent to about 20 percent of manganese oxide. Unfortunately, this pigment has two main disadvantages. It has an undesirable reddish color undertone and a limited tinting strength. The so-called red tinge is frequently noticeable to considerable disadvantage both in the concentrated and in the reduced state of the pigment. A reddish-grey rather than a neutral grey is obtained with a white extending or reducing agent. Its limited tinting strength means that the pigment has to be used in fairly large quantities in order to obtain a certain degree of grey. Due to this fairly large quantity in which the pigment has to be used, important properties of the pigmented material, such as its strength, for example, can be impaired.

An inexpensive, temperature-stable black pigment of adequate tinting strength and a neutral color undertone is desirable above all in the building materials industry.

It has now been found in accordance with the present invention that a process may be provided for the production of new temperature-stable manganese-iron oxide solid black pigments of high tinting strength whose color is neutral when reduced with white pigments. In this process, oxidic or oxide-forming starting materials of iron and manganese, respectively, are intimately mixed in finely divided form, in ratios by weight in the range of from about 25 parts of $Mn_2O_3$ to 75 parts of $Fe_2O_3$ to about 90 parts of $Mn_2O_3$ to 10 parts of $Fe_2O_3$, optionally in the presence of an alkali metal salt acting as a mineralizer; the resulting mixture is subsequently calcined at a temperature of from about 800° C. to 920° C. in an atmosphere with an oxygen content of at least about percent by volume and at the most about 20 percent by volume, whereby to form the desired new solid black pigments usable in the building materials or construction industry.

The process according to the invention is based on extensive research into the crystal chemistry of the system Fe/Mn/$O_2$. A. Muan and S. Somiya, Am. J. of Science 260 (1962), pp. 230–240, studied this system at temperatures in the range from 700° C. to 1,600° C. under a constant oxygen pressure of 0.21 atm., and produced a phase diagram according to which there exists a hematite phase ($\alpha$-$Fe_2O_3$), a bixbyt phase ($\alpha$-$Mn_2O_3$), a spinel phase and a hausmannite phase which show a certain degree of solubility in one another. This degree of solubility is governed by temperature. A maximum of about 13 percent of $Mn_2O_3$ is dissolved in the $\alpha$-$Fe_2O_3$ (trigonal), for example, at 997° C., whilst up to 60 percent of $Fe_2O_3$ can be incorporated into the $\alpha$-$Mn_2O_3$ phase (cubic). However, this literature reference did not provide any indication of the fact that temperature-stable pigments of high tinting strength can be developed from this system.

In the development of the process according to the invention, the following relationships were found to exist between the hue of the mixed oxides and their composition and the manufacturing conditions:

1. The principal bearer of the black pigment properties is the mixed crystal phase with the $\alpha$-$Mn_2O_3$ structure. The blackness of the concentrated samples and also the neutral grey hue when reduced with white pigments are largely independent of the $Fe_2O_3$ content of the mixed oxide phase above substantially 10 percent by weight of $Fe_2O_3$.
2. The $Mn_2O_3$-containing $\alpha$-$Fe_2O_3$ phase is tinged with red considerably more than the $\alpha$-$Mn_2O_3$ phase, and at best reaches one-third of its tinting strength.
3. In a mixture of the $\alpha$-$Fe_2O_3$ phase and the $\alpha$-$Mn_2O_3$ phase, the black pigment character of the $\alpha$-$Mn_2O_3$ phase is still dominant in cases where it is present in a quantity of only substantially 25 percent by weight.
4. If, due to an excessively high calcining temperature and/or to a deficiency of oxygen in the calcination atmosphere, an appreciable proportion of the manganese in present in the bivalent stage, a spinel phase (cubic) or a hausmannite phase (tetragonal) of the formula (Fe, Mn)$_3O_4$, is formed, both having a strong red tinge. If more than 10 percent by weight of these components are present in a mixture, the hue of the $\alpha$-$Mn_2O_3$ phase is impaired.

To enable at least 90 percent by weight of the total manganese to be present in the trivalent stage, and to ensure that not more than 10 percent by weight of manganese is bivalent, the calcination atmosphere must have a minimum oxygen content of 20 percent by volume at 920° C., and of 8 percent by volume at 820° C., or of 1 percent by volume at 800° C. The calcining atmosphere, which is in direct contact with the solid to be calcined, consists of normal air (with an oxygen content of 20 percent and a nitrogen content of 80 percent by volume) in the case of nondirect and electrical heating. Calcining the solid directly with a combustion gas (natural gas-, oil- or coal-combustion) and an excess of air, the calcining atmosphere consists of a mixture of oxygen, nitrogen, carbon dioxide and steam.

Apart from the calcination conditions referred to above, formation of the black mixed oxides is governed largely by the degree to which the reactants are mixed. If the end products are to show the required pigment character, the starting materials must have an adequate level of particle fineness, because the larger the reacting solid particles, the longer the diffusion paths over which the ions of the reactants have to travel, and hence the longer the reaction. Although a substantial reaction can ultimately take place, even with fairly coarse starting materials, by applying a relatively high calcination temperature and a fairly long heating period, relatively large particles of end product are formed under these more rigorous reaction conditions due to increased particle growth. However, excessively large particles of end product impair the tinting strength of the black pigment and are therefore undesirable.

Suitable solid starting compounds of iron include $Fe_3O_4$, $Fe(OH)_3$, FeOOH and active $Fe_2O_3$, provided these solids predominantly or mainly have particle sizes of less than 1/$\mu$. Active $Fe_2O_3$ means a finely divided iron oxide obtained by separating water at low temperatures (e.g. below 300° C.) from the hydroxide $Fe(OH)_3$, from $\alpha$-FeOOH in form of $\alpha$-$Fe_2O_3$ (hematite) or from $\gamma$-FeOOH in form of $\gamma$-$Fe_2O_3$. Active $Fe_2O_3$ can also be obtained by gentle oxidation of $Fe_3O_4$. Active $Fe_2O_3$ is readily soluble in weak mineral acids in contrast to $Fe_2O_3$ calcined at higher temperatures (above 600° C.). Examples of manganese compounds include $MnCO_3$, $Mn_2O_3$, MnOOH and pyrolusite, i.e., $MnO_2$, provided the particles of these compounds are predominantly or for the most part smaller than 5/$\mu$. Iron oxide black of the approximate formula $Fe_3O_4$, i.e., consisting essentially of $Fe_3O_4$, and pyrolusite of the approximate formula $MnO_2$, i.e., consisting essentially of $MnO_2$, are often preferred.

The iron and manganese starting materials are preferably used in a ratio by weight corresponding to a range expressed in terms of $Fe_2O_3$ and $MnO_2$ (regardless of the nature of the specific iron and manganese starting compounds) of between about 25–90 parts of $Mn_2O_3$ to 15–25 parts of $Fe_2O_3$ (i.e., 100 parts total), and preferably between about 30–70 parts of $Mn_2O_3$ to 10–30 parts of $Fe_2O_3$. The starting materials consist essentially of $Fe_3O_4$ and $MnO_2$. The compounds are understood to be of technical purity only, i.e., the $Fe_3O_4$ may have a content of about 2 percent $\gamma\text{-}Fe_2O_3$, 1 percent $SiO_2$, 0,5 percent carbon and 2 percent $H_2O$. A technical $MnO_2$ with a content up to 12 percent $SiO_2$ can be used, if it is present in a state of sufficient subdivision.

The calcining temperature is generally between about 800°–920° C., preferably 810°–860° C., and the calcining atmosphere, e.g., air, includes generally between about 1 –20 percent, preferably 8 –13 percent, by volume of oxygen, whereby to form end products containing at least 90 percent by weight of the total manganese present in trivalent state and at most 10 percent by weight total manganese in bivalent state.

Mixtures which react most readily are obtained by a precipitation process form a common aqueous solution of the salts of manganese and iron. In ideal mixtures such as these, the required reaction takes place at temperatures as low as about 800° C., over a period of some 30 minutes. A calcination temperature of 900° to 910° C. and a calcination time of from 1 to 2 hours is required in order completely to react $Fe_3O_4$ with an average particle size of $0.2\mu$ with finely ground pyrolusite.

Irrespective of the valency of the iron and manganese in the staring compounds, the average valency stage +3 is adjusted where calcination is carried out at temperatures of from about 800° to 920° C. provided the oxygen content of the calcination atmosphere is high enough, i.e., according to the above stated ranges.

In the event of an incomplete reaction, the product is tinged with red owing to an excessive $Fe_2O_3$-component.

Apart from the starting material and the temperature, the calcination time is also governed by the type of furnace and by the level to which the furnace is filled. The optimal calcination times may readily be determined by a test with continuous checks on the pigment.

It has also been found that the required mixed oxide formation is promoted to a surprisingly large extent by a series of substances such as alkali metal salts or boron oxide, $B_2O_3$. This mineralizing effect is reflected in a reduction of the calcination temperature required and/or in the reaction time. The salts of bivalent and trivalent metals have hardly any effect. The mineralizing effect is more pronounced in sodium salts than in potassium or lithium salts. It is governed by the concentration of the mineralizer and also by the degree to which the reaction components are mixed. Quantities as small as about 1.2 percent by weight of NaCl, based on the solid end product, produce a reduction in the calcination temperature from 910° to 820° C. In this case, the reaction of $Fe_3O_4$ with an average particle size of $0.2\mu$ with finely ground pyrolusite is over in 2 hours.

Apart from NaCl, other sodium salts such as, for example, the sulfate, nitrate, phosphate and carbonate are almost as suitable as mineralizers. Even so, all alkali metal salts, e.g., potassium, lithium, etc., chloride, sulfate, nitrate, phosphate and carbonate, can also be used. The most favorable salt concentration is from 1 to 2 percent by weight, based on the solid end product. More than 2.5 percent by weight of mineralizer can readily result in sintering of the mixed oxides. Below 800° C., the aforementioned mineralizers are quickly deprived of their effectiveness. Generally, salt concentrations between about 0.5 –2.5, preferably 0.8 –1.8, and more especially 1 –1.8, percent by weight, based on the solid end product, may be used.

The starting compounds, including the mineralizer, are best mixed in the aqueous phase. For example, iron oxide and manganese dioxide are mixed in the required ratio with water to form a suspension (with a solids content of 20 –60 percent), followed by the addition of the calculated quantity of mineralizer. The suspension is then intensively stirred for from 20 to 40 minutes, after which it is filtered. The quantity in which the mineralizer is used is governed by the amount of water left in the filter product. Given uniform starting compounds and filtration conditions, the water content of the filter product also remains sufficiently constant.

The amount of mineralizer present in the water of the filter product must be sufficient for the solid present in the filter product to be provided with the requisite quantity of mineralizer following evaporation of the water. The mineralizer-containing filtrate may be used to prepare the next suspension.

Mixing may also be carried out by a kneading process. It is less favorable to spray a mineralizer-containing solution onto a moist or dry mixture of the reaction components because, in this case, it is more difficult to obtain homogeneous admixture.

The starting mixture may be used in the form of a moist filter product or dry for calcination. Calcination may readily be carried out in an electrically heated oven or in an indirectly heated combustion furnace, provided that sufficient air is present in the calcination zone. In cases where a direct combustion furnace is used, precautions must be taken to ensure that a minimum content of oxygen is present in the calcination atmosphere, depending upon the calcination temperature. This minimum content amounts to from about 7 percent to 8 percent by volume at 820° C. Since the amount of oxygen present in the calcination atmosphere in the event of optimal combustion of oil or gas only amounts to substantially 3 percent by volume, additional air or even air enriched with oxygen must be introduced into the combustion zone. Otherwise, products tinged with red will be obtained, as mentioned herein above.

Black pigments of particularly high quality are obtained after a 2-stage calcination, in which the starting mixture is initially calcined in accordance with the invention, e.g., at 800°–920° 810°–860° or 800°–890° C., and then in a second stage is held in an oxygen-containing atmosphere at a temperature of from about 800° to 700° C., preferably 800°–720° C. The process is preferably carried out as follows:

In the first stage, calcination is continued for from 1 to 2 hours at temperature of from about 800° to 850° C., and preferably 820° C., in an atmosphere with an oxygen content of from about 7 percent to 8 percent by volume. Immediately afterwards, in the second stage, calcination is continued for about another hour in an atmosphere containing from about 12 to 14 percent by volume of oxygen, the temperatures being lowered from about 800° to 720° C. The calcine is then removed from the furnace, cooled in air or with water and then ground to the required pigment fineness.

The process according to the invention is illustrated by the following Examples:

EXAMPLE 1

The required ratio between the reactants and the mineralizer in the calcine: 66 parts by weight of $Fe_2O_3+34$ parts by weight of $Mn_2O_3+1.2$ parts by weight of NaCl. 91.3 kg. of iron oxide $Fe_3O_4$ with an average particle size of $0.2\mu$ and 62.0 kg. of pyrolusite with an $Mn_2O$ content of 86.6 percent and an average particle size of less than $5\mu$, are mashed with 320 litres of water in which 8.8 kg. of sodium chloride are dissolved, to form a homogeneous suspension which is intensively stirred for another 40 minutes and then filtered. The filter product contains 28.5 percent of $H_2O$. The filtrate has an NaCl content of 2.86 percent.

The moist filter product is then introduced into a rotary flame furnace directly heated with natural gas/air, and calcined at 820° C. for a period of 2 hours during which the oxygen content of the calcination zone is kept at from 8 percent to 9 percent by volume. The ratio of air to gas is then adjusted in such a way that the oxygen content in the calcination zone rises to 11 percent to 12 percent by volume. In addition, the absolute quantities of the gases are throttled to such an extent that, in one hour, the calcination temperature falls to 730° C. The product is then removed from the furnace and cooled in air. The crude product is ground to pigment fineness in a mill with a grading action. The black pigment thus obtained has an average particle size of about $0.4\mu$ (as determined by BET-measurement, and also by supermicroscopic examination). Compared with a comparison product obtained in accordance with German Auslegeschrift No. 1,191,063, referred to above, it has tinting strength 3.2 times greater, and is less tinged with red both in the concentrated state and when reduced with white pigments (tinting strength determined in accordance with ASTM Federal Test Method Standard No. 4221).

EXAMPLE 2

The required ratio of the reactants and mineraliser in the calcine: 66 parts by weight of $Fe_2O_3$+34 parts by weight of $Mn_2O_3$+1 part by weight of $NaPO_3$·637 g. of iron oxide $Fe_3O_4$ (average particle size $0.2\mu$) and 431.5 g. of very finely ground pyrolusite (average particle size less than $5\mu$), containing 87.8 percent of $MnO_2$, are mashed with 1.05 litres of water in which 71.3 g. of $NaH_2PO_4 \cdot 2H_2O$ are dissolved. The suspension is stirred intensively for 30 minutes and then filtered. The filter cake which has a water content of 27 percent, is dried at 110° C. After drying, the product is calcined for 2 hours at 820° C. in an electrically heated oven in the presence of 20 percent by volume of atmospheric oxygen, and then left to cool in air. This crude product is ground and tested.

The black test product has a tinting strength 3.6 times greater than that of the comparison pigment mentioned in example 1, has far fewer red tinges when concentrated, and has a neutral grey color when reduced or extended with white pigments.

In the absence of a mineralizer (in this case $NaPO_3$, formed on heating from $NaH_2PO_4 \cdot H_2O$), the aforementioned reaction mixture had to be heated for two hours at 900° C. to obtain the same pigment properties.

The same result as in the example described is obtained by using 1.5 parts of $NaNO_3$ or 1.8 parts of $Na_2CO_3$, based on 100 parts of reaction mixture (instead of the sodium phosphate).

EXAMPLE 3

The required ratio of the reactants and mineralizer in the calcine: 50 parts by weight of $Fe_2O_3$+50 parts of $Mn_2O_3$+1.16 parts of NaCl. 47.8 kg. of very finely ground pyrolusite, containing 85.1 percent of $MnO_2$ and 6.37 kg. of common salt, are added to 230 litres of an iron oxide slurry containing 37.0 kg. of $Fe_2O_3$. The suspension is mixed intensively for 30 minutes and then filtered. The filter product has a water content of 28.6 percent. It is calcined for 1 hour at 820° C. in an electrically heated oven in the presence of 20 percent by volume of atmospheric oxygen. The hot calcine is cooled in air and then ground.

Compared with the comparison pigment mentioned in example 1, the black test product shows far fewer tinges of red in its concentrated state, is neutral grey when reduced with white pigments and has a tinting strength which is 3.6 times greater than that of the comparison pigment.

EXAMPLE 4

The required ratio of the reactants in the calcine is: 20 parts by weight of $Fe_2O_3$ and 80 parts $Mn_2O_3$.

An Fe-Mn-oxide-hydroxide mixture prepared by precipitation from iron sulfate and manganese chloride solution with sodium hydroxide, containing, expressed as oxides, 200 g. of $Fe_2O_3$ and 800 g. of $Mn_2O_3$, is washed free from salts and filtered. The filter product is dried at 110° C. The dried product is calcined for 1 hour at 800° C. in an electrically heated oven in the presence of 20 percent by volume of atmospheric oxygen, and is then ground.

The black test product has the same hues as the mixed oxide mentioned in example 3 and a tinting strength 3.8 times greater than that of the comparison pigment mentioned in example 1.

EXAMPLE 5

The required ratio of the reactant in the calcine: 66.7 parts by weight of $Fe_2O_3$+33.3 parts by weight of $Mn_2O_3$.

232 g. of $FeSO_4 \cdot 7H_2O$ and 71 g. of $MnSO_4 \cdot 1H_2O$ are intensively mixed in a mortar mill, and the resulting mixture is introduced into a directly heated calcining oven. The initial quantity is heated for 2 hours at 800° C., as a result of which the sulfates decompose. The exhaust gases are passed through an absorption tower. A porous, reddish-brown residue is left, and after cooling, is reground in a mortar mill for the purpose of contacting the reactants. The mixture is then calcined for 2 hours at 850° C. in the presence of 20 percent by volume of oxygen. A black product is formed which has a tinting strength 2.2 times greater than that of the comparison pigment mentioned in example 1 and whose hue has far fewer blue tinges than that of the comparison pigment.

What is claimed is:

1. Process for the production of a temperature-stable solid black pigment of high tinting strength consisting essentially of mixed oxides of iron and manganese, which comprises calcining an intimate mixture of an iron member selected from the group consisting of oxidic and oxide-forming iron compounds and a manganese member selected from the group consisting of oxidic and oxide-forming manganese compounds, in a ratio by weight corresponding to substantially between about 25–90 parts of $Mn_2O_3$ to 75–25 parts of $Fe_2O_3$, in finely divided form at a temperature substantially between about 800°–920° C. in an atmosphere having an oxygen content of substantially between about 7–20 percent by volume.

2. Process according to claim 1 wherein said calcining is carried out in the presence of a mineralizer admixed with said intimate mixture, said mineralizer being a boron oxide or alkali metal salt selected from the group consisting of an alkali metal chloride, sulfate, nitrate, phosphate and carbonate.

3. Process according to claim 2 wherein said mineralizer is alkali metal salt used in an amount of substantially between about 0.5–2.5 percent by weight, based on the solid end product.

4. Process according to claim 3 wherein said alkali metal salt is a sodium salt.

5. Process according to claim 4 wherein said sodium salt is selected from the group consisting of chloride, sulfate, nitrate, phosphate and carbonate, and said salt is used in an amount of substantially between about 0.8–1.8 percent by weight based on the solid end product.

6. Process according to claim 1 wherein said iron member is selected from the group consisting of $Fe_3O_4$, $Fe(OH)_3$, FeOOH and active $Fe_2O_3$, and said manganese member is selected from the group consisting of $MnCo_3$, $Mn_2O_3$, MnOOH and pyrolusite.

7. Process according to claim 1 wherein said iron member has a particle size predominantly below 1 micron and said manganese member has a particle size predominantly below 5 microns.

8. Process according to claim 1 wherein said iron member is $Fe_3O_4$ and said manganese member is pyrolusite.

9. Process according to claim 1 wherein said iron member is $Fe_2O_3$ and said manganese member is $Mn_2O_3$.

10. Process according to claim 1 wherein said iron member is iron oxide black of the approximate formula $Fe_3O_4$ and said manganese member is pyrolusite of the approximate formula $MnO_2$, said members being mixed in a ratio by weight corresponding to the range of from 70 parts of $Fe_2O_3$ to 30 parts of $MnO_2$ to 30 parts of $Fe_2O_3$ to 70 parts of $Mn_2O_3$ in the presence of sodium chloride as mineralizer admixed therewith in an amount of from 1–1.8 percent by weight, based on the solid end product, and said calcining being carried out at a temperature of from 810°–860° C. in the presence of from 8–13 percent by volume of oxygen.

11. Process according to claim 10 wherein the calcined solid end product is subjected to a second calcination at a temperature of from 800°–700° C. in an oxygen-containing atmosphere.

12. Process according to claim 11 wherein the starting mixture is initially calcined at a temperature of from 800°–850° C. in the presence of from 7–8 percent by volume of oxygen, and then subjected to said second calcination in the presence of from 12–14 percent by volume of oxygen at a temperature of from 800°–720° C.

13. Process according to claim 1 for the production of a temperature-stable solid black pigment of high tinting strength consisting essentially of mixed oxides of iron and manganese and containing at least 90 percent by weight total manganese in trivalent stage and at most 10 percent by weight total manganese in bivalent stage, which comprises calcining an intimate finely divided mixture of an iron member selected from the group consisting of $Fe_3O_4$, $Fe(OH)_3$, Fe OOH and active $Fe_2O_3$, in a particle size predominantly below 1 micron, and a manganese member selected from the group consisting of $MnCO_3$, $Mn_2O_3$, MnOOH and pyrolusite, in a particle size predominantly below 5 microns, in a ratio by weight corresponding to substantially between about 25–90 parts of $Mn_2O_3$ to 75–25 parts of $Fe_2O_3$, at a temperature substantially between about 800°–920° C. in an atmosphere having an oxygen content of substantially between about 7–20 percent by volume.

14. Process according to claim 13 wherein said calcining is carried out in the presence of an alkali metal salt selected from the group consisting of alkali metal chloride, sulfate, nitrate, phosphate and carbonate, as mineralizer admixed with said intimate mixture in an amount of substantially between about 0.5–2.5 percent by weight, based on the solid end product.

15. Temperature-stable solid black pigment of high-tinting strength consisting essentially of mixed oxides of iron and manganese, produced by the process which comprises calcining an intimate mixture of an iron member selected from the group consisting of oxidic and oxide-forming iron compounds and a manganese member selected from the group consisting of oxidic and oxide-forming manganese compounds, in a ratio by weight corresponding to substantially between about 25–90 parts of $Mn_2O_3$ to 75–25 parts of $Fe_2O_3$, in finely divided form at a temperature substantially between about 800°–920° C. in an atmosphere having an oxygen content of substantially between about 7–20 percent by volume, and grinding to pigment particle size.

16. Pigment according to claim 15 wherein said calcining is carried out in the presence of a mineralizer admixed with said intimate mixture in an amount of substantially between about 0.5–2.5 percent by weight, based on the solid end product, said mineralizer being a boron oxide or alkali metal salt selected from the group consisting of an alkali metal chloride, sulfate, nitrate, phosphate and carbonate.

17. Pigment according to claim 16 wherein said iron member is iron oxide black of the approximate formula $Fe_3O_4$ and said manganese member is pyrolusite of the approximate formula $MnO_2$, said members being mixed in a ratio by weight corresponding to the range of from 70 parts of $Fe_2O_3$ to 30 parts of $MnO_2$ to 30 parts of $Fe_2O_3$ to 70 parts of $Mn_2O_3$ in the presence of sodium chloride as mineralizer admixed therewith in an amount of from 1–1.8 percent by weight, based on the solid end product, and said calcining being carried out at a temperature of from 810°–860° C. in the presence of from 8–13 percent by volume of oxygen.

18. Temperature-stable solid black pigment of high-tinting strength according to claim 15 consisting essentially of mixed oxides of iron and manganese and containing at least 90 percent by weight total manganese in trivalent stage and at most 10 percent by weight total manganese in bivalent stage, produced by the process which comprises calcining an intimate finely divided mixture of an iron member selected from the group consisting of $Fe_3O_4$, $Fe(OH)_3$, Fe OOH and active $Fe_2O_3$, in a particle size predominantly below 1 micron, and a manganese member selected from the group consisting of $MnCO_3$, $Mn_2O_3Mn_2O_3$, MnOOH and pyrolusite, in a particle size predominantly below 5 microns, in a ratio by weight corresponding to substantially between about 25–90 parts of $Mn_2O_3$ to 75–25 parts of $Fe_2O_3$, at a temperature substantially between about 800°–920° C. in an atmosphere having an oxygen content of substantially between about 7–20 percent by volume.

* * * * *

PO-1050
(5/69)

UNITED STATES PATENT OFFICE
CERTIFICATE OF CORRECTION

Patent No. 3615810        Dated October 26, 1971

Inventor(s) Wilhelm Holznagel et al

It is certified that error appears in the above-identified patent and that said Letters Patent are hereby corrected as shown below:

Col. 1, line 52

After "about" insert -- 7 --.

Col. 2, line 17

"in" should be -- is --.

Col. 2, line 66

")." should be at end of line 65.

Col. 2, line 69

"5,$\mu$" should be -- 5$\mu$ --.

Col. 3, line 30

"staring" should be -- starting --.

Col. 8, line 35

Delete one "$Mn_2O_3$".

Signed and sealed this 25th day of April 1972.

(SEAL)
Attest:

EDWARD M. FLETCHER, JR.
Attesting Officer

ROBERT GOTTSCHALK
Commissioner of Patents